United States Patent [19]
Podvin et al.

[11] Patent Number: 4,609,264
[45] Date of Patent: Sep. 2, 1986

[54] APPARATUS FOR POSITIONING FLAT OBJECTS FOR MICROSCOPIC EXAMINATION

[75] Inventors: T. Charles Podvin, Poway; Peter J. Van Benschoten, Rancho Santa Fe, both of Calif.

[73] Assignee: The Micromanipulator Microscope Company, Inc., Carson City, Nev.

[21] Appl. No.: 693,627

[22] Filed: Jan. 22, 1985

Related U.S. Application Data

[63] Continuation-in-part of Ser. No. 572,932, Jan. 23, 1984, Pat. No. 4,557,568.

[51] Int. Cl.[4] .............................................. G02B 21/26
[52] U.S. Cl. .................................... 350/529; 108/137; 355/45; 355/75; 350/532
[58] Field of Search ............... 350/532, 531, 529, 321; 108/137, 139; 355/45, 75; 33/1 M, 181 R

[56] References Cited

U.S. PATENT DOCUMENTS

| | | | |
|---|---|---|---|
| 3,508,806 | 2/1968 | Hall | 350/531 |
| 3,641,648 | 2/1972 | Kalberman | 29/743 |
| 4,118,869 | 10/1978 | Hartung et al. | 33/568 |
| 4,126,376 | 11/1978 | Gommel et al. | 350/531 |

Primary Examiner—Jon W. Henry
Attorney, Agent, or Firm—Fitch, Even, Tabin & Flannery

[57] ABSTRACT

An apparatus positions a flat, rectangular object, such as a photomask, on a stage below the objective of a microscope in the XY plane with provision for rotation in the XY plane to correct for a theta shift. A pair of rails are mounted parallel on the stage and may be adjustably mounted to hold different sizes of flat objects therebetween. The members for locating the object in an exact X and Y location on the rails and for theta shifting the object are preferably mounted on the respective rails and are movable therewith to accommodate various sizes of objects. An inexpensive theta shift is achieved by inexpensive stops and pivot mounted on one rail and a spring biased plunger and an adjustable member on the other rail. An adjustment member carries an abutment dowel that contacts the flat object along the end surface opposite to the end stop and is displaced in the Y direction relative to the stop so as to act on the flat object in a rotational direction opposite to the direction rotation caused by the plunger. The adjustment means is operable by a single screw mechanism, whereby turning a single knob at the end of a screw corrects for theta shift. The abutment down is slanted over the flat object, thereby preventing upward or Z directional displacement of the flat object.

25 Claims, 6 Drawing Figures

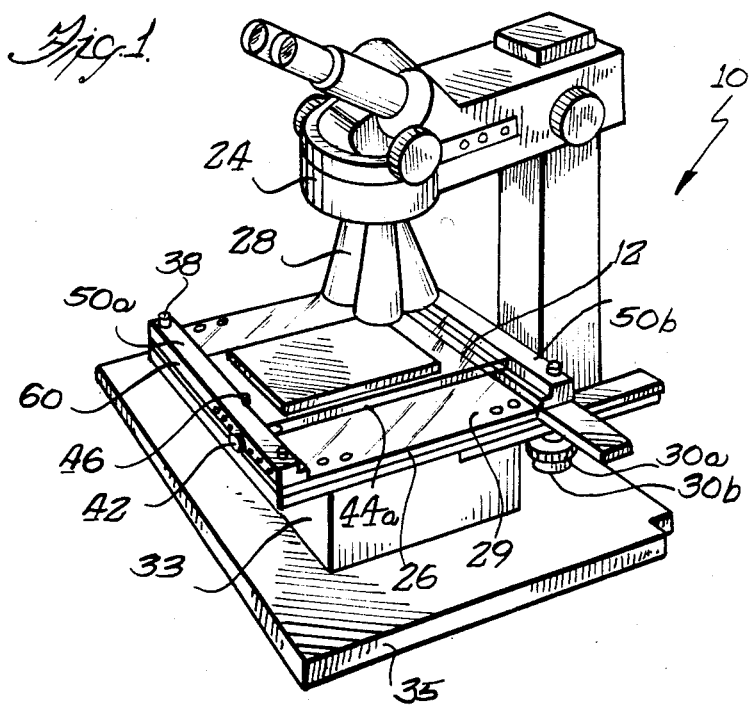
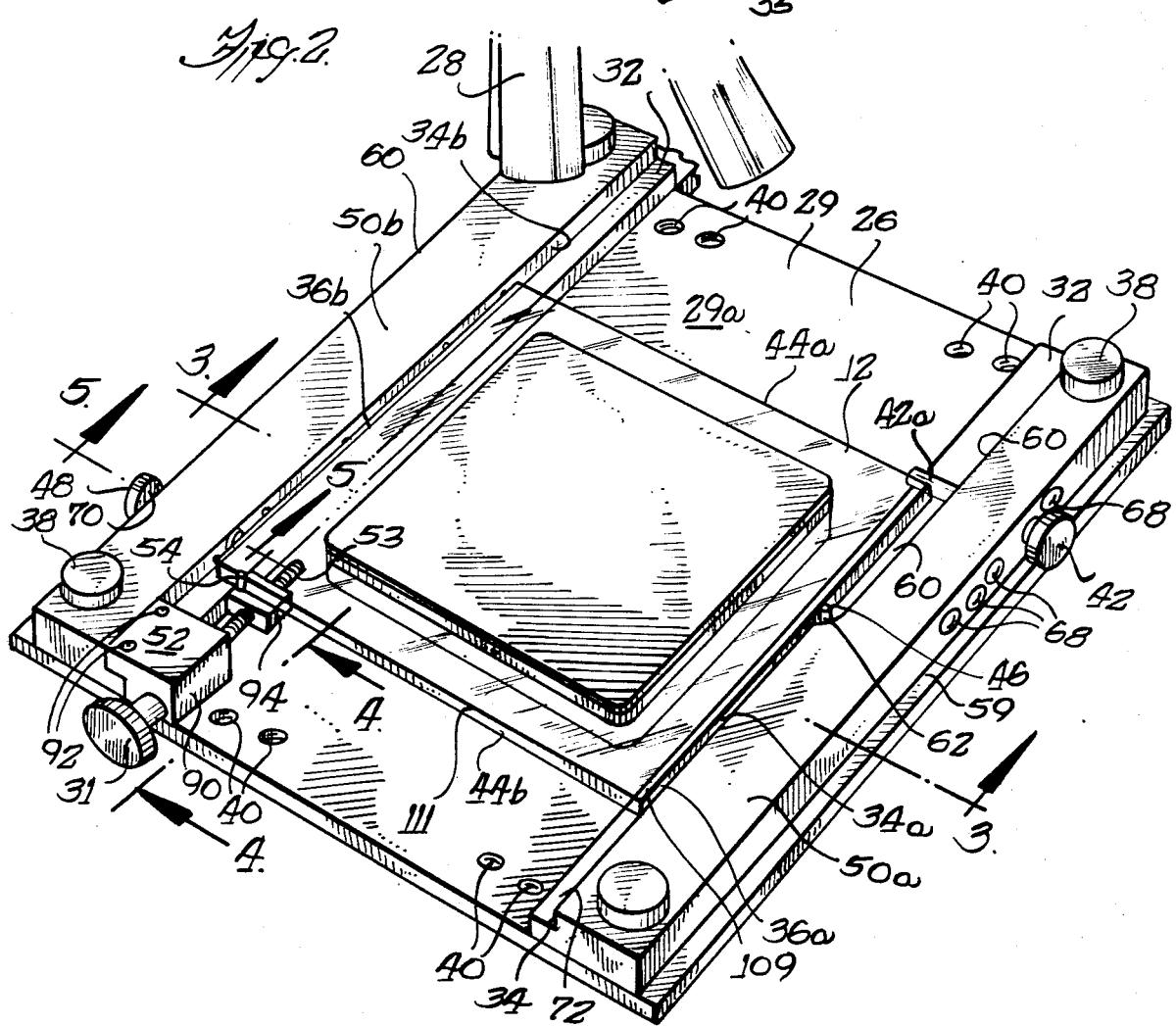

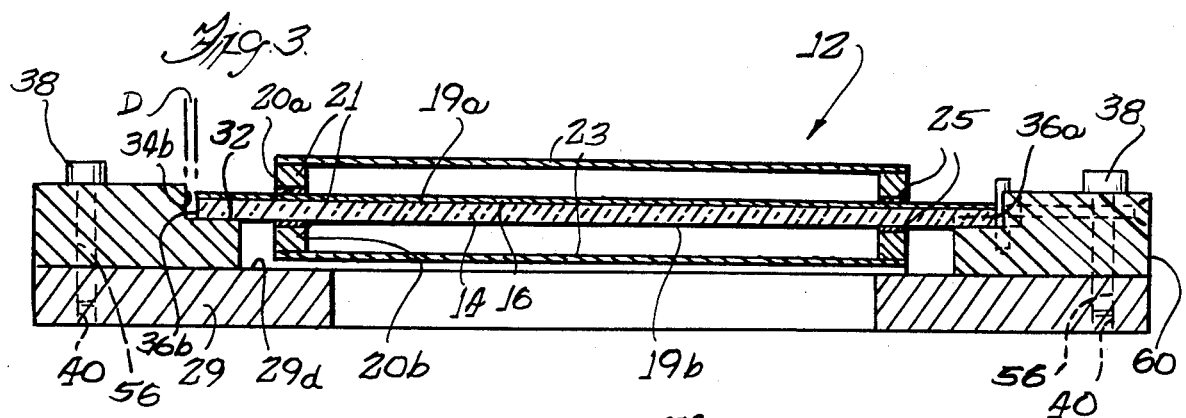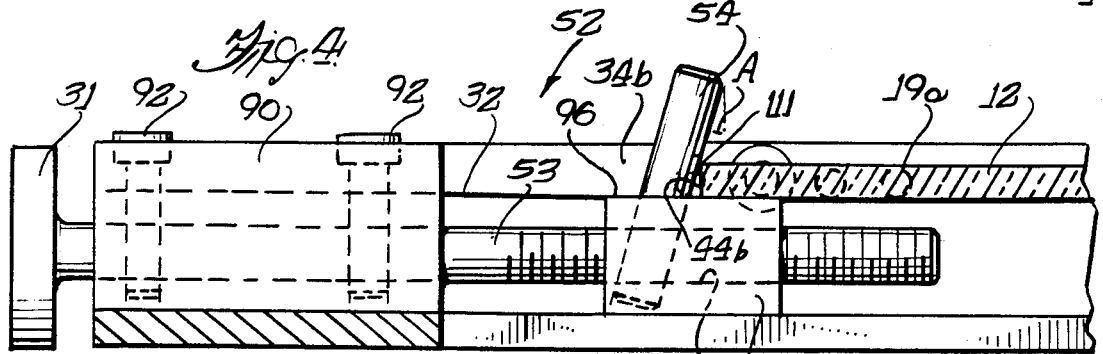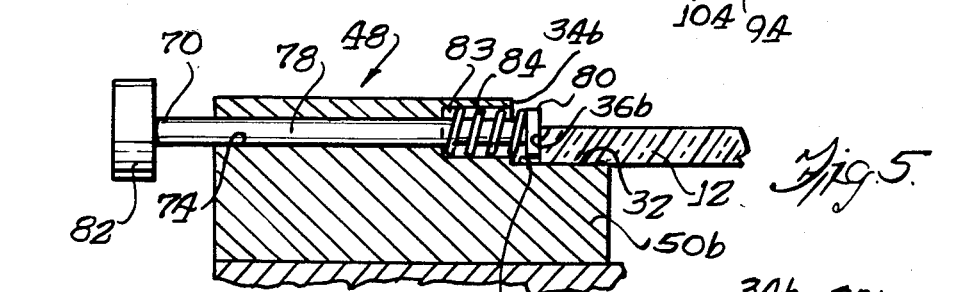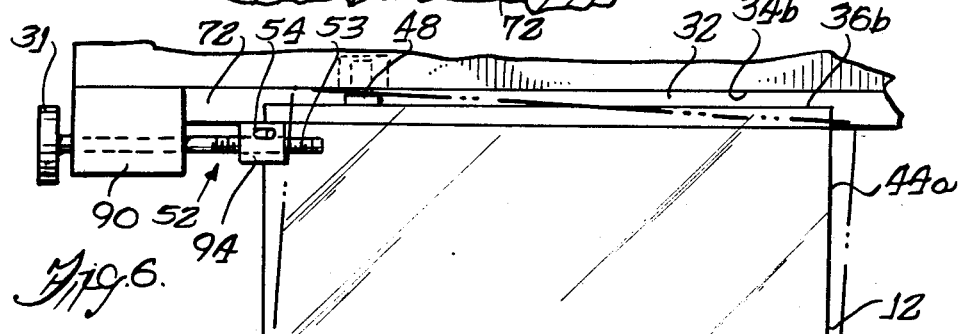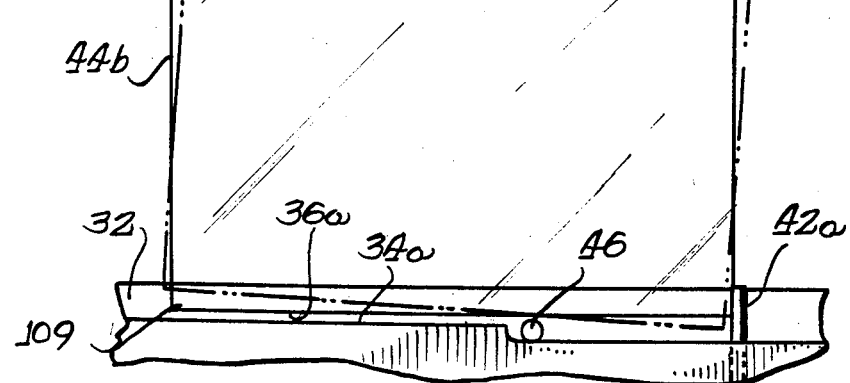

APPARATUS FOR POSITIONING FLAT OBJECTS FOR MICROSCOPIC EXAMINATION

This application is a continuation-in-part of U.S. Ser. No. 572,932 filed Jan. 23, 1954, now U.S. Pat. No. 4,557,568.

The present invention relates to microscopic inspection of flat rectangular objects and more particularly to an improved means for positioning flat, rectangular, delicate objects in front of the objective of the microscope with the objects precisely situated in an XY plane and also rotationally adjusted in the XY plane.

The present invention is particularly useful in an apparatus which is currently used for positioning flat, rectangular objects in front of the objective of a microscope. This particular apparatus is for inspecting photomasks that are used for forming integrated circuits by a microlithography technique.

The microlithography technique is similar to photography except that glass coated with etched chrome, called a photomask, serves as the negative from which the integrated circuit is printed. The negative or photomask is formed from a photomask blank comprising a glass plate covered on one surface with a layer of chromium, which is, in turn, covered with a photo-resist layer. The resist of the blank is exposed to a focused geometric light pattern, creating a photochemical change in the exposed area. The exposed blank is then subjected to a developing solution that removes exposed resist, and the blank is then exposed to an acid solution which removes the underlying chromium in the regions where the resist has been removed, thereby etching the geometric pattern into the chromium. Relatively recently, it has become common practice to protect the developed photomask from dust by packaging the photomask as a unit with at least its etched surface and frequently both surfaces protected by a "pellicle". The pellicle consists of a frame and a membrane of transparent material, such as nitrocellulose or a PEHB, stretched across the frame to overlie the etched surface, spaced therefrom by about 3-6 mm.

The pellicle-protected photomask is then used for projecting the geometric pattern onto a silicon wafer that is coated with a thin layer or membrane of photo-resist. By a multi-step process, the exposure pattern is developed into an integrated circuit of the precise projected geometric pattern.

The developed photomask contains much minute detail, and functioning of the integrated circuit requires precise transfer of the geometric pattern to the developed photomask. Photomasks are therefore inspected under a microscope several times, both before and after development. When the photomask is inspected prior to exposure, light of wavelengths to which the resist is insensitive is used.

As a means of aligning the photomask below the objective of a microscope, it is known to provide a movable stage on which the photomask is positioned. The stage has adjustment means for moving the stage in both the X and Y axes, i.e., end-to-end and forward and rearward. Accurate inspection of photomasks require that they be precisely aligned in an XY plane so that the patterns that are observed as the photomask is moved according to X and Y adjustments of the stage can be correlated with coordinates on the photomask. Desirably the same apparatus can be used to accommodate a variety of photomasks which come in a variety of sizes.

A complication in the inspection of photomasks arises because the edges of the photomask pattern may be out of parallel with the boundaries of the photomask itself. Typical specifications call for a parallelism of plus or minus one degree, which deviation from parallelism is known in the industry as "array rotation" or "theta shift". In order to accurately examine a photomask using the X and Y movements of a movable stage, it is necessary to first correct for any theta shift.

It is a primary object of the present invention to provide apparatus for placing a flat, rectangular object, such as a photomask, in an XY plane and to adjust to accommodate a small theta shift. It is a further object of the invention to provide apparatus which accommodates flat rectangular objects of a variety of sizes and to do so in a simple, straightforward manner.

Several mechanisms have been proposed for positioning flat rectangular objects in an XY plane and for correcting slight theta shift misalignment; however, several of the proposed mechanisms are relatively complicated, requiring adjustment of several knobs or screws, for X, Y and theta adjustment, and the present invention seeks to provide apparatus which is more simply constructed. U.S. Pat. No. 4,126,367 describes apparatus in which a slide is mounted on ball bearings and its X, Y and theta positions adjusted by the interaction of at least three adjustment knobs.

In U.S. Pat. No. 3,508,806, a flat, rectangular ojbect is positioned in one direction by several leaf springs. Adjustment in a perpendicular direction is effected by simultaneous adjustment of a pair of side-by-side knobs. Theta adjustment may be accomplished by adjustment of one of the knobs individually, thereby causing the flat object to become skewed, offsetting the sides of the objection from parallel relative to the perpendicular direction.

In U.S. Pat. No. 4,118,869 a flat rectangular object is secured to a bearing affixed to the center of its lower surface. An adjustment member acts on the bearing to adjust the position in the X direction and a pair of adjustment members operated simultaneously adjust the position in the Y direction. Either of the Y direction adjustment members may be operated individually to correct for theta shift. Not only is this device complicated in that, as with the mechanisms described above, position adjustment requires adjustment of more than one knob or screw, but the device is not suitable for use in inspecting an object through which light must pass because the opaque bearing is situated at and affixed to the center of the photomask.

U.S. Pat. No. 3,641,648 is a further example of apparatus with multiple adjustment screws for X, Y and theta adjustment.

The present invention provides a simple engagement of the photomask at diagonally opposite corners which locate the photomask in the X and Y directions. Then, at one of the corners the photomask is actuated to pivot about a pivot point at the opposite diagonal corner. Preferably, a pivot and stop are located at one corner and the actuators for pivotal actuation are at the other diagonal corner. To accommodate different sizes of masks, the actuators are carried by one rail for repositioning therewith and the stop and pivot are carried by the other parallel rail for repositioning therewith.

More specifically, the illustrated photomask inspection station includes a microscope and a horizontal stage having means for moving a photomask placed thereon in an end-to-end (X) direction as well as in the forward and rearward direction (Y) to successively position all portions of the photomask that require inspection below the microscope objective. A pair of guide rails each have a horizontal support surface for together supporting a photomask thereon and a vertical edge surface for laterally positioning the lateral side surfaces of the photomask therebetween. Means are provided for securely mounting the guide rails on the stage spaced apart at selected distances in the Y direction so as to accommodate a photomask of any particular width within a certain range. The rails are mounted from the stage spaced apart so as to receive the photomask between the vertical edge surfaces, leaving a narrow spacing between each lateral side surface of the photomask and each vertical rail surface. The slight spacing permits the photomask to be skewed relative to parallel to the rails for theta shift correction. An end stop means is positioned to abut one end surface of the photomask and thereby substantially define the position of the photomask in the X direction. The end stop is adapted to abut against one end surface of the photomask so as to permit sliding or pivoting of the end surface relative thereto during theta shift correction. A pivot is associated with one of the guide rails and is placed so as to abut one of the lateral side surfaces of the photomask, acting to space the photomask generally midway between the vertical rail surfaces and permit pivoting and camming of the photomask side surface relative thereto during theta shift correction. On the lateral side opposite the pivot there is disposed a spring-biased plunger which is positioned displaced in the X direction relative to the pivot to act upon tha lateral side surface to constantly bias or exert a torque upon the photomask in a first rotational direction. Furthermore, there is provided an adjustable limit means that carries an abutment means which acts on the end surface of the photomask that is opposite the stop means and which is displaced in the Y direction relative to the stop means so that the adjustment means acts upon the photomask in the second rotational direction, in opposition to the force extended by the plunger. The limit means carries the abutment means either against the end surface to theta shift the photomask in the second rotational direction or carries the abutment means away from the end surface to permit the spring-biased plunger to rotate the photomask in the first rotational direction to the extent permitted by the position of the abutment means. With the Y position of the photomask substantially predetermined by the relative spacing of the rail means securely mounted to the stage and with the X position substantially predetermined by the placement of the end stop along one of the rails, theta shift is corrected by a single manipulation of the adjustable limit means.

As a means to prevent upward or Z directional movement of the photomask during theta shift correction, the abutment means carried by the adjustable limit means is an angled dowel which contacts the upper edge of the photomask at the junction of the top surface and end surface of the photomask, so as to exert both an X direction pressure and a downward pressure on the photomask.

These and other objects and advantages of the invention will now be decribed in greater detail with reference to the accompanying drawing in which FIG. 1 is a perspective view of a photomask inspection station including a microscope, a movable stage positioned below the objective of the microscope, photomask positioning apparatus embodying various features of the invention mounted on the stage, and a photomask positioned on the photomask positioning apparatus;

FIG. 2, rotated about 90° relative to FIG. 1, is an enlarged perspective view of the photomask placed on the positioning apparatus;

FIG. 3 is a cross-sectional view taken along line 3—3 of FIG. 2;

FIG. 4 is an enlarged elevation view of the adjustable limit means of the positioning apparatus of FIG. 2;

FIG. 5 is an enlarged cross-sectional view taken along line 5—5 of FIG. 2; and

FIG. 6 is a simplified plan view, illustrating theta shift adjustment of the photomask.

Illustrated in FIG. 1 is a perspective view of a work station 10 which is used for examining rectangular photomasks 12, each including a glass plate 14 (FIG. 3) and a thin etched metal coating 16. The front surface 19a of the photomask 12 that is covered with the metal coating 16 is protected with a pellicle 20a and the rear glass surface 19b of the photomask 12 is likewise protected with another pellicle 20b. Each pellicle 20a,b comprises a rectangular metal (e.g., aluminum) frame 21 over which a transparent membrane 23 is stretched. The pellicle 20 is bonded to the photomask with double-sided adhesive tape 25 so that each membrane 23 is spaced between about 3 to 6 mm. above the respective surface 19. It is particularly important that the pellicle membranes 23 not be damaged during the inspection.

The work station 10 includes a microscope 24 and a stage 26 disposed below the objective 28 of the microscope on which the photomask 12 is positioned for inspection. The microscope 24 may be a stereomicroscope or a compound microscope with a long (greater than 6 mm) working distance objective.

The stage 26 includes a lower support plate 35; a housing 33; and an upper plate 29 on which the photomask positioning apparatus is mounted. Below the top plate 29 is mounted a mechanism for moving the top plate of the stage in the X and Y directions. Such mechanisms are known in the art and will not be described in great detail. For example, a rack and pinion mechanism may be used. The operator moves the stage in the forward or rearward (Y) direction by means of one knob 30a and in the side to side (X) direction by means of another knob 30b. The housing 33 contains electrical apparatus for adjusting the intensities of illuminators (not shown) which are mounted to shine through a window in the top plate 29.

Heretofore, a variety of mechanisms have been used to position a photomask on a stage for microscopic inspection. A common means required loading of the photomask into a paddle (not shown) and the forward edge of the paddle was then aligned to slide into a slidway carried on rails secured to the stage at fixed locations thereon. The photomasks typically varied in sizes from two inches to five inches in width and the size of the aperture in a given paddle was likewise made to accommodate but a single size of photomasks. Thus, for example, each of the respective paddles had openings of two, three, four or five inches to receive a similarly sized photomask, and all of the paddles had the same width to fit into the dovetail slidway grooves in a pair of rails. Thus, the photomasks had to be loaded into the paddles and then the paddles had to be carefully handled and slid into the dovetailed slideways on the rails while taking care not to damage the pellicles and/or photomasks.

In other systems photomasks were placed on stages that carried relatively complicated mechanisms for adjustment of the photomasks in the X and Y directions and rotationally for theta shift correction. Examples of such prior art mechanisms are described above.

In accordance with the present invention, apparatus is provided for mounting a photomask on a stage without paddles in a manner so that a single adjustment knob 31 (FIG. 2) is used to precisely finally align a photomask 12 for inspection. A pair of guide rails 50 are provided into which the photomask may be directly loaded. The rails 50a,b each have a horizontal surface 32 for supporting a side portion of the photomask and a vertical surface 34a,b running in the X direction along which a lateral side surface 36a,b of the photomask is to be placed.

Means, such as bolts 38 and threaded holes 40 in the top plate 29, are provided for mounting the rails 50a,b spaced apart at certain distances on the top plate 29 of the stage 26 in the front to rear or Y direction to accommodate a variety of sizes of photomasks with their lateral side surfaces 36a,b spaced a small distance (D, FIG. 3) from the vertical surfaces 34 of the guide rails. The small spacing between the lateral side surfaces of the photomask and the vertical surfaces of the guide rails permit the photomask to be in a slighly skewed orientation with its lateral side surfaces 36a,b slightly offset from parallel with the guide rails to accommodate theta shift correction.

In accordance with the present invention, a photomask 12 is mounted on a support surface, such as, for example, the rails 50 and the photomask is rotated to provide a theta shift by first or second actuator means 31 and 48 which act to pivot the mask about a pivot 46 associated with one (lower right) corner of the mask with the mask sliding along a stop 42 which holds the mask against movement in the X direction. The actuators 31 and 48 are located in the opposite diagonal corner, herein the upper left corner, of the mask. Preferably, the actuator 31 is a biasing means having a spring biased plunger constantly urging the upper lateral left edge of the mask to move down and to swing in a counter clockwise direction about the pivot 46. The photomask 12 is moved in the opposite rotational direction by the actuator 48 which engages the upper left end 44b of the photomask to pivot the corner in a clockwise direction about the pivot 46. Preferably, the actuator 31 includes a screw adjustment which provides infinite and small movements of the mask as the operator shifts an actuating member to the left or the right as viewed in FIG. 2.

During the actuation, there is a tendency for the photomask 12 to lift from the support surface of the rails, and this tendency to lift is overcome by making the actuator member 54 in the form of an inclined member or pin having its upper end overlying the top upper edge of the photomask. Thus, the actuator pin will also be applying a downward holding force to this upper diagonal corner of the photomask as it is pivoted.

The present invention is particularly suited for operation with various sizes of photomasks because the two actuators 31 and 38 are associated with and movable with the lower rail 50a. Herein, the actuators 31 and 48 are mounted on the upper rail and the stop and pivot are mounted on the lower rail. The stop is preferably in the form of a pin which is adjustably positioned on the lower rail to accommodate photomasks of different X direction lengths.

Thus, it will be seen that the theta shift may be accomplished with simple and inexpensive elements added to the rails. These elements are preferably carried by the rails so as to be effective even though the rails are shifted to accommodate different sizes of photomasks.

The photomask 12 is acted upon at each of its side surfaces 36a,b and end surfaces 44a,b by means which define its rotational position in the XY plane. Associated with one of the guide rails 50a is an end stop means or pin 42 which may be positioned at various locations along one of the rails 50a to abut one end surface 44a of the photomask and thereby limit movement of the photomask in the X direction. Also associated with one of the rails 50a is a pivot pin 46 which extends inward of the vertical surface 34a of one of the rail 50a and spaces the photomask 12 about midway between the opposed vertical surfaces 34a,b. The pivot pin 46 abuts one of the lateral side surfaces 36a of the photomask to facilitate its camming and pivoting thereagainst as it shifts rotationally. Associated with the opposed rail 50b and abutting the opposed lateral side surface 36b of the photomask 12 is a biasing means 48 which is positioned opposed to the pivot pin 46 to turn the photomask in one rotational direction (counterclockwise in the FIGURES). At the end surface 44b of the photomask oposite to the end surface 44a abutting against the end stop 42, is an adjustable limit means 52 that carries an abutment means 54. The limit means 52 also has the single adjustable knob 31 that is operably connected to a single screw shaft 53 that moves the abutment means either in an inward direction to urge the photomask 12 in a second rotational direction (clockwise in the FIGURES) in opposition to the biasing means 48 or in an outward direction, yielding to allow the biasing means to shift the photomask in the first rotational (counterclockwise) direction.

Thus, the pre-positioning of the rails 50a,b defines the position of the photomask in the Y direction; the prepositioning of the end stop 42 defines the position of the photomask in the X direction; and theta shift correction is accomplished with the turning of the single knob 31 of the adjustable limit means 52. Generally a plurality of photomasks 12 of the same dimensions will be inspected successively, and a single mounting of the rails 50a,b and a single positioning of the end stop 42 suffices for positioning a series of similarly dimensioned photomasks. The variation in theta shift of each photomask is then individually accommodated by the rotational adjustment mechanism which requires only adjustment of the single knob 31.

More specifically, as a means of adjusting the spacing between the guide rails, the top plate 29 of the stage 26 has a parallel row of the threaded holes 40 running in the Y direction, and the guide rails 50 each have a pair of end holes 56 spaced apart to align with a selected pair of opposed top plate holes. Threaded fasteners, e.g., bolts 38, extend through the rail end holes 56 and are screwed into appropriate opposed holes 40 of the top plate 29 to securely mount each rail to the top plate. The holes 40 in the row are spaced at selected distances, so that with selected parallel mounting of the rails, a series of photomasks of several sizes may be carried on the rails, each with its lateral side surfaces 36a,b spaced slightly from the rail surfaces 34a,b.

As a means of positioning the end stop 42 to define the X directional position of the rectangular photomask 12, a series of threaded holes 68 extend horizontally through one of the rails 50a, from the outer rail surface 59 to the vertical rail surface 34a and the threaded end stop means or stop pin 42 extends through a selected threaded hole and into a photomask seating region 72 to thereby position one end surface 44a of the photomask. The portion of the shaft of the end stop pin 42 that extends through a selected one of the threaded horizontal holes 68 is threaded so as to be secured within the threaded hole; however, the end portion of the shaft 42a which extends into the photomask seating region has a smooth surface to permit the abutting end surface 44a and the corner of the photomask to slide thereagainst.

When a photomask 12 of a different size is to be inspected, the guide rails 50 are bolted to different pairs of opposed threaded top plate holes 40, and/or the threaded end stop 42 is moved to a different horizontal hole 68 in the guide rail 50a.

In the illustrated embodiment, the rails 50a,b run from end to end, one positioned at the front of the stage 26 with respect to the operator and one positioned at the rear of the stage with respect to the operator. Of course, the apparatus could be modified so that the rails would run in a front to rear direction.

The illustrated guide rails 50a,b have generally rectangular cross sections except for the indentations 88 along their upper inside (facing) surfaces that provide the seating regions 72 that include the horizontal support surfaces 32 on which the bottom surface 19b (FIG. 3) of the photomask plate 14 rests and the vertical surfaces 34a,b between which the lateral side surfaces 36a,b of the photomask plate fit. The horizontal surfaces 32 of the rails 50 are sufficiently spaced above the top plate upper surface 29a to space whichever pellicle 20b extends from the bottom surface 19b of the photomask 12 above the level of the surface 29a of the top plate 29, thereby avoiding damage to the protective membrane.

The illustrated pivot is a smooth-surfaced cylindrical pin 46 which extends upward from one of the guide rails 50a at the edge of the seating region 72 and relatively close to the end stop 42. In the illustrated embodiment, an indented region 60 is set back from the vertical surface 34a of the seating region 72 in one of the guide rails 50a to accommodate the pivot pin 46. The vertical pivot pin 46 extends partially inward, in the Y direction, relative to the vertical surface 34a so as to position the lateral side surfaces 36a,b of the photomask 12 spaced from each vertical surface 34a,b of the guide rails 50a,b preferably about equidistant. The smooth cylindrical outer surface 62 of the pivot pin 46 permits the abutting lateral side surface 36a of the photomask to pivot thereagainst during rotational adjustment for theta shift correction.

The other rail 50b carries the biasing means 48 most clearly illustrated in FIG. 5, which biases the photomask 12 in the first rotational direction, and rail 50b also is associated with the adjustable limit means 52 that cooperates with the biasing means to define the rotational position of the photomask 12 in the XY plane. The biasing means 48 includes a plunger 70 which extends through a horizontal opening 74 in the rail 50b and into the seating region 72. The plunger 70 has a shaft 78 that extends through the opening 74, an end boss 80 that bears against the lateral side surface 36b of the photomask 12 and a knob or handle 82 at the other end by which the plunger may be manually pulled outward. A spring 84 seats between the inner surface of the boss and the end of an inner countersunk portion 83 of the opening 74. When placing the photomask 12 on the rails, the plunger 70 is pulled outward, compressing the spring 84, and upon release of the plunger, the spring pushes the boss 80 against the lateral surface 36b of the photomask. The horizontal opening 74 through which the plunger 70 extends is offset in the X direction relative to the vertical pivot pin 46 that is abutting the opposed lateral side surface 36a of the photomask 12, whereby the plunger 70 in urging a portion of the photomask in a forward direction exerts a rotational force thereagainst in a first rotational direction. The spring-biased plunger 70 in urging the photomask 12 forward also cooperates with the pivot pin 46 in positioning the photomask between the vertical surfaces 34a,b of the rails 50a,b. That is, whereas the pivot limits forward displacement of the photomask, the plunger pushes the photomask against the pivot and limits rearward displacement of the photomask.

The adjustable limit means 52, best seen in FIG. 4, which acts against the biasing means 48 in a second rotational direction, is positioned in the illustrated embodiment closely adjacent to the spring-biased plunger 70 and associated with the same rail 50b. A stationary block 90 is configured complementary to the inner side of the rails 50b and attached by means of a pair of bolts 92 to the seating region 70 of the rail. Alternatively, the stationary block could be attached directly to the top plate 29. A slidable block 94 is positioned inward (towards the photomask) of the stationary block 90. The height of the slidable block 94 is such that when resting upon the surface of the top plate 29, its own upper surface 96 is substantially flush with that of the horizontal rail surface 32 and helps to support the photomask 12 thereontop.

The slidable block 94 carries the abutment means or dowel 54 which extends upward from its upper surface for contacting the end surface 44b of the photomask, thereby cooperating with the plunger 70 to define the rotational position of the photomask and also cooperating with the end stop 42 to define the X position of the photomask. The screw shaft 53 provides for inward and outward movement of the slidable block 94 relative to the stationary block 90. The shaft 53 extends through the stationary block 90 and is retained therein so as to be freely rotatable with respect to the stationary block 90 but axially stationary relative thereto. The inward end of the shaft 53 is threaded and is received in a threaded opening 104 through the slidable block 94. Turning the screw shaft 53 by means of the knob 31 at the opposite end of the shaft slides the slidable block 94 inward to carry the dowel 54 against the photomask 12 or outward towards the stationary block 90. Because the abutment dowel 54 is positioned displaced in the Y direction from the stop pin 42 at the opposite end surface 44a, inward movement of the abutment dowel, as carried by the slidable block 94, causes a (clockwise) rotational movement of the photomask 12 in opposition to the action to the plunger 70. Outward movement of the slidable block 94 carrying its abutment dowel 54, of course, allows the plunger 70 to move the photomask further in the first (counterclockwise) rotational direction.

Generally, for insertion of the photomask onto the seating region 72 of the rails, the adjustment screw 100 is turned to shift the slidable block 94 and adjustment dowel 54 outwardly toward the stationary block 90. The plunger 70 is manually pulled outward, and the photomask is placed in the seating region 72 of the rails. This may be accomplished by inserting the photomask into the seating region 72 at a slight angle so that a leading end surface 44a of the photomask 12 is positioned on the horizontal surfaces 32, then sliding the photomask 12 until its leading end surface 44a contacts the end stop 42, and allowing the other end of the photomask to drop into position. In this manner, the photomask 12 is placed on the stage 26 without the pellicle 20b abutting any potentially damaging surfaces. Release of the plunger 70 pushes the photomask 12 against the pivot pin 46 and rotates the photomask as far as it can in the first (counterclockwise) rotational direction, that is, until one of the corners 109 abuts the corresponding vertical surface 34a of the rail 50a. Then the adjustment knob 31 is turned until the abutment dowel 54 contacts the end surface 44b of the photomask. If the photomask is not already abutting against the end stop pin 42, it will be urged thereagainst by inward motion of the abutment dowel 54. Thus the limit means cooperates with the stop pin in defining the X directional position, with the stop pin limiting the displacement of the photomask in one X direction and the limit means limiting displacement of the photomaks in the other X direction. Continued turning of the knob 31 rotates the photomask 12 in the second (clockwise) rotational direction until the correct rotational position is reached for theta shift correction. Clockwise theta shift correction is represented by the broken line rectangle in FIG. 6. The photomask pattern may carry an XY indicator to help determine when the correct theta position is reached. Thereafter, the photomask is inspected by movement of the stage in the X and Y direction in a conventional manner by means of the knobs 30a,b that drive the stage-shifting mechanism.

An important aspect of the invention is the disposition of the abutment dowel 54 at an angle so that the dowel extends over the photomask 12, contacting the photomask plate 14 at an upper edge 111 at which the end surface 44b and the top surface 19a of the photomask 12 meet. The dowel 54, is canted at an angle A (FIG. 4) of between about 5° and about 45° and preferably between about 10° and about 20° relative to the vertical, not only abuts the photomask 12 to help define its rotational position but also helps to hold the photomask down on the horizontal surfaces 32 of the rails 50a,b that is, to limit its movement in the upward or Z direction. With the photomask 12 urged in opposite rotational directions by the spring-biased plunger 70 and by the adjustment means 52, there is a tendency for the photomask 12 to dislocate upwards when the photomasks is pivoted. The simple expedient of an angled dowel 54 serving as the abutment means prevents this lifting action.

Several advantages of the present invention can now be more fully appreciated. A very simple mechanism is provided for precisely positioning a photomask in the X and Y direction as well as rotationally in the XY plane. It is a very simple matter to precisely position the rails according to the preformed threaded holes on the top surface of the stage and to position the end stop pin in one of the horizontal holes in one of the rails, thereby setting the X and Y position for photomasks of a particular size. With these limits already set, theta shift can be corrected very quickly. The amount of theta shift correction depends upon the excess spacing along the lateral sides of the photomask, but up to 5° is easily provided, far in excess of the theta shift correction generally required.

Although the invention has been described in terms of a certain preferred embodiment, modifications obvious to one with ordinary skill in the art may be made without departing from the scope of the invention. The theta shift correction mechanism has been described in terms of four components, including an end stop which also serves as a pivot or camming surface for the photomask, the pivot, the plunger and the adjustable limit means. These components could be rearranged in a variety of manners around the periphery of the photomask to act upon the end and edge surfaces with similar results achieved, namely that the biasing means exerts a torque in a first rotational direction and the adjustable limit means limits or opposes this torque. The end stop 42 and either the limit means 52 or torque means 48 need not be associated with the rails but could be mounted directly from the stage. For example, the end stop could be a vertical pin that fits in one of a series of holes running in the X direction along the top plate 29 of the stage.

Various features of the invention are set forth in the following claims.

What is claimed is:

1. Apparatus for providing a rotational adjustment of a rectangular object mounted at a given location in the X and Y directions, said apparatus comprising:
    a frame support,
    first and second rails mounted on said frame support and supported in parallel relationship to each other on said frame support and supporting therebetween the rectangular object,
    means mounting the rails for spacing the first and second rails in adjusted positions to accommodate different sizes of objects therebetween,
    means on each of said rails for engaging and positioning the object thereon at a predetermined location with respect to the rails, and
    adjustment means engaging the flat object and for exerting a force thereon to rotate the object through a small adjustment in the XY plane.

2. An apparatus in accordance with claim 1 in which said adjustment means comprises a slanted member engaging the object and slanted over the object to hold the same down, said slanted member being mounted on one of said rails.

3. An apparatus in accordance with claim 2 in which said adjustment means comprises a threaded screw for displacing the slanted member with turning of the threaded screw to rotate the object.

4. Apparatus for providing a rotational adjustment of a rectangular object mounted at a given location in the X and Y directions, said apparatus comprising:
    support means for supporting the object in a given plane,
    a pivot for engaging one lateral side of the object in a first corner for holding the object against movement in the Y direction while allowing rotation of the object about the pivot,
    a stop engaging an end of the object at the first corner for holding object against movement in the X direction while allowing sliding of the end along the stop as the object rotates about the pivot,
    first means engaging the other lateral side of the object at a diagonal corner diagonally opposite the first corner and operable to pivot the object in a first rotational direction with the first end sliding along said stop, and
    second means engaging the other end of the object at the diagonal corner to pivot the object about the pivot in a rotational direction opposite to the first rotational direction with the first end wall sliding along said stop.

5. An apparatus in accordance with claim 4 in which the first means comprises a biasing means continuously urging the object to pivot in the first rotational direction.

6. An apparatus in accordance with claim 5 in which the second means comprises an adjustable member movable in a first direction against the urging of the biasing means to cause pivoting of the object in the opposite rotational direction, said adjustable member movable in a second and opposite direction to allow the biasing means to turn the object in the first rotational direction.

7. An apparatus in accordance with claim 4 in which said support means comprises a pair of parallel, spaced rails, and means mounting the rails in adjusted spacing from each other to accommodate different sizes of objects therebetween.

8. An apparatus in accordance with claim 7 in which said pivot and stop are carried on a first rail and said first and second means are carried on the other rail.

9. Apparatus in accordance with claim 8 in which means mount the stop in adjusted positions on the first rail to accommodate different sizes of objects.

10. Apparatus in accordance with claim 4 in which said second means comprises an actuator member holding the object against lifting from the support means.

11. Apparatus in accordance with claim 10 in which said member is an angled pin abutting the object with its upper end overlying the object and holding the same downwardly.

12. Apparatus for providing a rotational adjustment of a rectangular object mounted at a given location in the X and Y directions, said apparatus comprising:
   support means for supporting the object in a given plane,
   a pivot for engaging one lateral side of the object in a first corner for holding the object against movement in the Y direction while allowing rotation of the object about the pivot,
   a stop engaging an end of the object at the first corner for holding object against movement in the X direction while allowing sliding of the end along the stop as the object rotates about the pivot,
   biasing means engaging the object at a diagonal corner opposite the first corner and urging the object to pivot in a first rotational direction, and
   means including an angled pin engaging the object at the diagonal corner to hold the object down in the given plane and for shifting the object in second and opposite rotational direction.

13. An apparatus in accordance with claim 12 in which said support means comprises a pair of parallel rails adjustably mounted to vary the spacing therebetween, said stop and pivot being associated with the first rail and said biasing means and angled pin being associated with the second rail.

14. Apparatus for positioning a flat rectangular object in an XY plane with lateral side surfaces running generally in the X direction and end surfaces running generally in the Y direction and providing for small rotational adjustment of said flat object in the XY plane, the apparatus comprising
   surface means for supporting said flat object in the XY plane,
   a pair of rails extending above said surface means running in the X direction and having opposed vertical surfaces spaced apart a distance slightly greater than the width between said lateral side surfaces for approximately positioning said lateral side surfaces therebetween to generally position the object in the Y direction but allowing for the object to be repositioned with its lateral side surfaces at small angles relative to said opposed vertical surfaces,
   a first pivot means associated with one of said rails for contacting one lateral side surface for spacing said flat object between said rail surfaces and for permitting said contacted lateral side surface to pivot thereagainst,
   a second pivot means for contacting one end surface of said flat object, substantially limiting the displacement of said flat object in one X direction,
   a biasing means for continuously acting upon either the side surface or the end surface of said flat object that is opposite either of said first or second pivot means and positioned relative to the opposed pivot means so as to continuously exert a rotational torque on said object in a first rotational direction, and
   an adjustable limit means for abutting against the side surface or end surface of said flat object that is opposite the other of said first or second pivot means and positioned relative to said opposed pivot means for acting against the object in the second, opposite rotational direction to said biasing means, said limit means being movable against said flat object so as to rotate said object in the second rotational direction or away from said object to allow said flat object yield to the torque exerted by said biasing means to rotate in the first rotational direction, said biasing means or said adjustable limit means, whichever is opposed said second pivot means, also limiting the displacement of said flat object in the other X direction.

15. Apparatus according to claim 14 further including hold-down means associated with said limit means to prevent Z-directional displacement of said flat object from said surface means.

16. Apparatus according to claim 15 wherein said hold down means comprises an abutment member that is configured to contact an edge of said flat object remote from said surface means to both define the rotational limit of said flat object in the first rotational direction and to prevent Z directional displacement therefrom.

17. Apparatus for positioning a flat rectangular object on a stage below the objective of a microscope for examination of the flat object with the flat object disposed on a surface in an XY plane and with its lateral side surface running generally in the X direction and its lateral end surface, running generally in the Y direction and providing for small rotational adjustment of said flat object in the XY plane, the apparatus comprising,
   a pair of rails having opposed vertical surfaces and means to mount said rails parallel at various spaced apart distances on said stage to extend above the stage and approximately position said lateral side surfaces between said opposed vertical surfaces but allowing for the object to be repositioned with its lateral side surfaces at small angles relative said vertical rail surfaces,
   stop means for contacting one end surface of said flat object, substantially limiting the movement of said flat object in one X direction while permitting said object to cam or pivot thereagainst, pivot means associated with one of said rails for contacting one lateral side surface of said object for spacing said flat object between said vertical rail surfaces and for permitting said contacted lateral side surface to pivot thereagainst, biasing means for continuously acting upon the side surface or end surface of said flat object that is opposite either said pivot means or said stop means and positioned relative to said opposed pivot means or stop means so as to continuously exert a rotational torque in a first rotational direction, and an adjustable limit means for contacting the side surface or end surface of said flat object that is opposite the other of said pivot means or stop means and is positioned relative to said opposed pivot means or stop means for acting on said object in the second rotational direction opposed to said biasing means, said adjustable limit means being movable against said flat object to rotate said object in the second rotational direction or away from said object to allow said flat object to yield to the torque exerted by said biasing means and rotate in the first rotational direction, said biasing means or said adjustable limit means, whichever is opposed to said stop means, also limiting the movement of said flat object in the second X direction.

18. Apparatus according to claim 17 wherein said biasing means is positioned to act on the side surface of said object opposite said pivot means and said limit means is positioned to act on the end surface of said object opposite said stop means.

19. Apparatus according to claim 18 wherein said stop means is positioned along one of said rails.

20. Apparatus according to claim 19 wherein said stop means and said pivot means are disposed along one of said rails and said biasing means and said limit means are associated with the other of said rails.

21. Apparatus according to claim 17 wherein said biasing means is a spring-biased plunger pushing said object away from one of said vertical rail surfaces.

22. Apparatus according to claim 17, each rail having horizontal surfaces for together supporting the objecting elevated above said stage.

23. Apparatus according to claim 17 wherein said limit means includes an abutment member for contacting said object, said abutment member being configured to contact an upper edge of said flat object to both limit rotation in the first direction and also to limit Z directional displacement.

24. Apparatus according to claim 17 wherein said limit means comprises a fixed member, a slidable member and threaded means for moving said slidable member relative to said fixed member.

25. Apparatus according to claim 24 wherein said slidable member carries an abutment member in the form of a dowel, said dowel being disposed at an angle relative to the vertical to abut an upper edge of the flat object, thereby limiting rotation of the object in the first direction and also limiting Z directional displacement of said object.

* * * * *